United States Patent [19]

Hayes

[11] Patent Number: 4,931,539

[45] Date of Patent: Jun. 5, 1990

[54] HIGHLY-SOLUBLE, AMORPHOUS SILOXANE POLYIMIDES

[75] Inventor: Richard A. Hayes, Parkersburg, W. Va.

[73] Assignee: E. I. du Pont De Nemours and Company, Wilmington, Del.

[21] Appl. No.: 319,313

[22] Filed: Mar. 6, 1989

[51] Int. Cl.$^5$ ............................................. C08G 69/26
[52] U.S. Cl. ................................... 528/353; 528/125; 528/126; 528/128; 528/176; 528/188; 528/229
[58] Field of Search ............... 528/353, 125, 126, 128, 528/176, 188, 229

[56] References Cited

U.S. PATENT DOCUMENTS

| | | | |
|---|---|---|---|
| 3,274,155 | 9/1966 | Saunders et al. | 260/46.5 |
| 3,598,784 | 8/1971 | Holub et al. | 260/46.5 |
| 4,395,527 | 7/1983 | Berger | 528/26 |
| 4,480,009 | 10/1984 | Berger | 428/447 |
| 4,558,110 | 12/1985 | Lee | 528/26 |
| 4,586,997 | 5/1986 | Lee | 525/426 |
| 4,652,598 | 3/1987 | Edelman | 524/99 |
| 4,808,686 | 2/1989 | Cella et a. | 528/27 |

FOREIGN PATENT DOCUMENTS

| | | |
|---|---|---|
| 0295561 | 12/1988 | European Pat. Off. . |
| 0297756 | 1/1989 | European Pat. Off. . |
| 0303480 | 2/1989 | European Pat. Off. . |
| 61-64730 | 4/1986 | Japan . |
| 63-213524 | 9/1988 | Japan . |

Primary Examiner—John Kight, III
Assistant Examiner—M. L. Moore

[57] ABSTRACT

Highly-soluble, fully-cyclized siloxane polyimides, which contain at least in part, polymerized units derived from 4,4'-[2,2,2-trifluoro-1-(trifluoromethyl)ethylidene]-bis(1,2-benzenedicarboxylic acid anhydride), (6FDA), are disclosed. The polymeric compositions, their preparation and film/coating products are described.

5 Claims, No Drawings

HIGHLY-SOLUBLE, AMORPHOUS SILOXANE POLYIMIDES

BACKGROUND OF THE INVENTION

1. Field of the Invention

The present invention relates to highly soluble aromatic polyimides wherein the dianhydride used to form the polyimide is at least partly 6FDA. The remaining portion of the dianhydride-derived polyimide is derived from several of the more common aromatic dianhydrides, as defined below, used to form polyimides. The diamine portion of the polyimide is derived essentially from amine terminated siloxane units.

2. Prior Art

As taught in the prior art, siloxane-containing polyimides can be prepared by, for example, reacting a siloxane-containing diamine with a dianhydride. The initial product of such reactions, a polyamide acid, has been found to be soluble in highly polar solvents, such as N-methyl pyrrolidone. Solutions of such polyamide acids have been typically used to coat substrates. Such coatings have been converted to the siloxane-containing polyimide by heating, usually between 150° C. and 400° C., to remove the solvent and to effect cyclization of the polyamide acid. These processes are complicated by further problems, such as void formation caused by the evolution of the by-product water during the cure step and the like.

These polyimides, while useful as protective coatings for semi-conductors and other electronic devices, suffer from the shortcoming of being insoluble in most low boiling organic solvents. They suffer from the shortcoming that many semiconductor devices cannot be heated to the extreme temperatures required to effect the cyclization of the precursor polyamide acid (150° C.–400° C.) as discussed above. Further, it has been taught in the prior art that such polyamide acids are unstable to hydrolysis. Such hydrolysis would tend to degrade the utility of the final product. Because of these and other shortcomings, it would be highly desirable to have siloxane-containing polyamide materials which are soluble in low-boiling solvents.

These shortcomings have been partially overcome in the prior art. Berger, in U.S. Pat. No. 4,395,527, discloses that polyimides incorporating a siloxane unit of formula

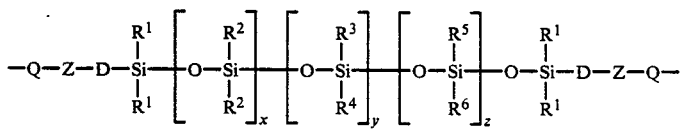

where Q is a substituted or unsubstituted aromatic group; Z is

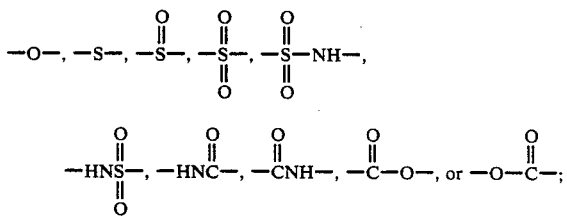

D is an unsubstituted or substituted hydrocarbylene; $R^1$, $R^2$, $R^3$, $R^4$, $R^5$, and $R^6$ are each independently unsubstituted or substituted hydrocarbyl; X, Y and Z each independently has a value from 0 to 100; have improved solubility parameters. For example, these polyimides are taught to be soluble in chlorinated hydrocarbon solvents such as dichlorobenzene and trichlorobenzene and in good polar solvents such as N, N-dimethyl acetamide, N-methyl caprolactam, dimethylsulfoxide, N-methyl-2-pyrrolidone, tetramethyl urea, pyridine, dimethylsulfone, hexamethyl phosphoramide, tetramethylene sulfone, formamide, N-methylformamide, butyrolactone and N-acetyl-2-pyrrolidone (U.S. Pat. No. 4,395,527, column 28, line 65). However, one shortcoming found for these materials is their lack of solubility in very weak solvents, such as toluene. Further, as one knowledgeable in the art would appreciate, this reference requires the use of unusual monomers which are not readily available.

Lee, in U.S. Pat. No. 4,558,110, discloses crystalline polyimides which incorporate polydiorganosiloxane units terminated with amine functions. These materials are found to be soluble in ortho-dichlorobenzene but not soluble in good aprotic solvents, such as N-methyl pyrrolidone.

Incorporation of bis(aminoalkyl)siloxane components into polyimides has not been shown to be a sufficient criteria for polyimide solubility. The prior art teaches that such materials suffer from the shortcoming of being insoluble in most low boiling organic solvents (see, for example, U.S. Pat. Nos. 4,395,527, 4,480,009, 4,449,149, 4,586,998, 4,609,569, and U.S. Pat. No. 4,652,598). Lee, in U.S. Pat. No. 4,558,110 discloses crystalline polyimides which contain bis(amino alkyl)-terminated siloxanes. These materials were found to be soluble in halogen-containing solvents, such as ortho-dichlorobenzene. However, these materials were not found to be soluble in even very good aprotic solvents, such as N-methyl pyrrolidone. No solubility of these materials in very weak aprotic solvents, such as toluene, was reported.

SUMMARY OF THE INVENTION

The present invention circumvents the above shortcomings and provides a class of fully-cyclized, siloxane-containing polyimides which are soluble in weaker solvents. This more soluble class of polyimides is compositionally prepared essentially from amine-terminated siloxane units and aromatic dianhydrides which comprise, at least in part, 4,4'[2,2,2-trifluoro-1-trifluoromethyl)ethylidene]-bis(1,2-benzenedicarboxylic acid anhydride) (6FDA), which has the following structural formula:

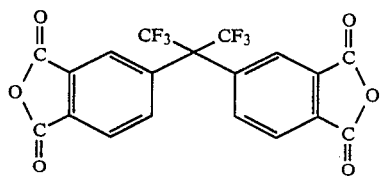

Suitable polyimide compositions which have enhanced solubility include polyimides with the following repeating units:

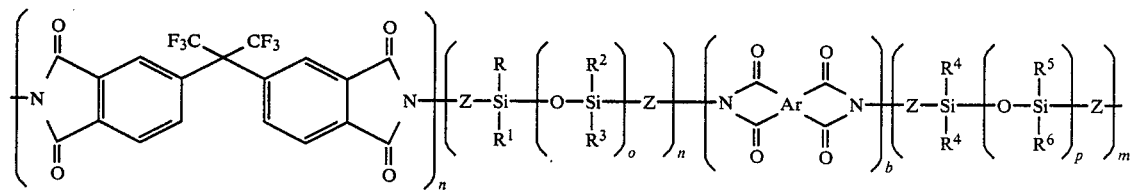

where Ar is a tetravalent aromatic moiety as typically used to form aromatic polyimides, —Z— is a divalent alkylene or arylene radical, —R to $R^6$ are independently monovalent substituted or unsubstituted hydrocarbon radicals such that:

$a = 5–100\%$ and preferably 50–100%
of $a + b$
$n + m = 100\%$
$o = 1–4$

DETAILED DESCRIPTION

The highly-soluble fully-cyclized siloxane polyimides of the present invention have the following repeating units:

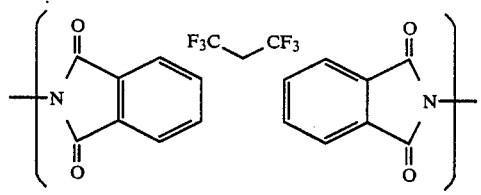

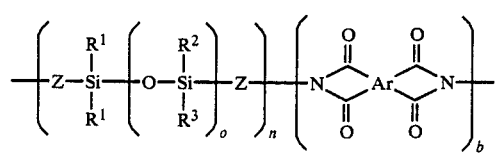

where Ar is an aromatic radical, of the formula

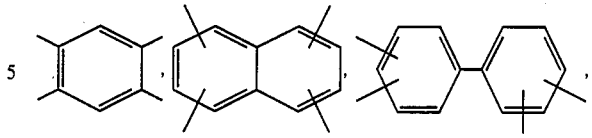

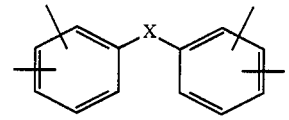

or mixtures thereof, —X— is or mixtures thereof, —X— is

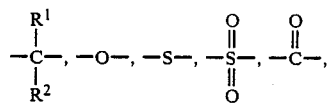

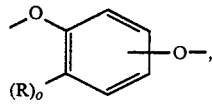

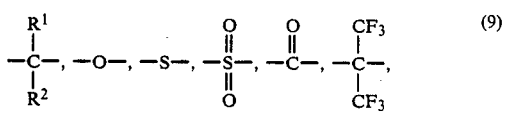

linear alkylene groups of the formula —(CH$_2$)—$_{1-3}$ or mixtures thereof, where —X'— is

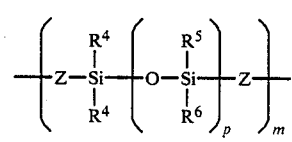 (9)

or mixtures thereof,
—Z— is a divalent substituted or unsubstituted alkylene or arylene radical, —R, —R$_1$, —R$^2$, R$^3$, —R$^4$, —R$^5$, and —R$^6$ are independently monovalent substituted or unsubstituted hydrocarbon radicals such that a=5–100%, more preferably 50–100%, b=100−a, n+m=100%, o=1−4.

These materials have been found to be soluble in a surprisingly wider range of solvents than found in the prior art while retaining excellent thermal properties. Examples of the herein described class of siloxane polyimides have been found to be soluble in such very weak solvents as toluene. This class represents the only fully-cyclized siloxane polyimide materials which span the range of solubility in very good solvents, such as N- methyl pyrrolidone and cresols to the before mentioned very weak solvents.

It is believed that the surprisingly enhanced solubility for this class of aromatic polyimides is a direct result of a combination of structural features incorporated therein.

It is known that some fully-cyclized polyimides which incorporate 4,4'-[2,2,2-trifluoro-1-(trifluoromethyl)ethylidene]-bis(1,2-benzenedicarboxylic acid anhydride) (6FDA) are soluble in good aprotic solvents, such as N-methyl pyrrolidone. This solubility is usually attributed to the hexafluoroisopropylidene function incorporated therein. This function serves to separate the imide linkages to prevent ring conjugation within the polyimide chain. This function further serves to disrupt the macromolecular structure of the polyimide chain, thus hindering inter-chain organization. This incorporation of 6FDA into polyimides is, however, rarely adequate to provide enhanced polymer solubility in weak solvents such as acetone. One such case, disclosed by Rogers in U.S. Pat. No. 3,356,648, required the hexafluoroisopropylidene function to the incorporated within the diamine component as well as the dianhydride component. This incorporation has not been shown to be a sufficient criteria for polyimide solubility in even weaker solvents, such as toluene.

The combination of the above-mentioned structural features serves to give the surprisingly high solubilities over a wide range of solvents for the herein described class of polyimides. The surprising solubilities of these materials offers great opportunity to ease the fabricated processes for many final products. For example, in the electronics industry, many semi-conductor components are sensitive to both extreme heat and strong solvents. When prior art siloxane polyamide acid compositions are utilized to coat said semiconductor components, strong solvents and high temperatures (150°-400° C.) to drive off the solvent and effect cyclization to the siloxane polyimide are required, as described before. These defects have been partially circumvented in the prior art through the use of soluble, fully-cyclized siloxane polyimide materials. However, these prior art materials still suffer from being soluble in only relatively good solvents which require relatively high temperatures to drive off the solvent during fabrication processes. The materials described herein can be easily dissolved in very weak solvents, such as toluene, which don't suffer from the defect of damaging said semiconductor components. Further, these very weak solvents are highly volatile and, therefore, would require low temperatures to effect evaporation. As the artisian can appreciate, these surprising properties of the herein described siloxane polyimides offers great benefit in the ease of fabrication processes of such products.

EXAMPLES

Example 1

To a stirred solution of 1,3-bis(3-aminopropyl)-1,1,3,3-tetramethyl-disiloxane (24.85 g, 0.1 mol) in N-methyl pyrrolidone (350 ml) was added 4,4'-[2,2,2-trifluoro-1-(trifluoromethyl) ethylidene]-bis(1,2-benzenedicarboxylic acid anhydride) (6FDA, 44.84 g, 0.101 mol) under a nitrogen atmosphere at room temperature. The resulting low viscosity solution was allowed to stir over 3 days at room temperature. A solution of acetic anhydride (37.7 ml, 0.40 mol) and triethylamine (55.8 ml. 0.40 mol) was added at room temperature with rapid stirring. After stirring at room temperature for 4 hours, the low viscosity solution was precipitated in water. The resulting solid was washed with water and allowed to air-dry overnight. The polymer was further dried in a vacuum oven (20 inches mercury) at 120° C. for 3 hours and 250° C. for 5 hours.

This polyimide was found to be soluble in toluene, acetone, methylene dichloride, N-methyl pyrrolidone and m-cresol at 20% solids (weight).

Differential Scanning Calorimetry (DSC) was performed on this polymer using a Du Pont Thermal Analyzer Model 990-3 with cell model HCBl-s/NOO523, 10° C./minute progress rate in a nitrogen atmosphere. A transition correlatable to a Tg was observed at $T_{onset}=86.4°$ C., $T_{midpoint}=89.5°$ C., and $T_{endpoint}=90.8°$ C.

Thermogravimetric Analysis (TGA) was performed on the above polymer using a Du Pont Thermogravimetric Analyzer Model 99-2 with cell Model 951-5 in an air atmosphere at a 10° C./minute progress rate. A 5% weight loss was observed at 355° C., a 25% weight loss was observed at 430° C. and a 50% weight loss was observed at 455° C.

Films were case from a 15% solution of the above polymer (based on weight) in N-methyl pyrrolidone onto a glass plate treated with Du Pont TEFLON ® dry lubricant at 100° C. with a 15-mil ($38 \times 10^{-5}$) knife gap. TEFLON ® dry lubricant contains a fluorocarbon telomer which reduces the adhesion of the film to the glass plate. The films were dried on the plate at 100° C. for 30 minutes, cooled to room temperature and dried in a vacuum oven (20 inches [51 cm] mercury) at room temperature overnight. The film were removed from the glass plates by soaking in water. The films were dried in a vacuum oven (20 inches [51 cm] mercury) at 120° C. for 3 hours.

The resulting clear films were flexible and could be creased without breaking.

A film was cast from a 15% solution of the above polymer (based on weight) in toluene onto a glass plate treated with Du Pont TEFLON ® dry lubricant at 25.5° C. with a 20 mil ($5.1 \times 10^{-5}$ m) knife gap. The film was dried on the plate at 25.5° C. for 1 hour and then dried in a vacuum oven (20 inches [51 cm] mercury) overnight. The film was removed from the plate by soaking in water and was then dried in a vacuum oven (23 inches [58 cm] mercury) at 100° C. for 4 hours.

The resulting clear films were flexible and could be creased without cracking.

EXAMPLE 2

To a stirred solution of 1,3-bis(3-aminopropyl)-1,1,3,3-tetramethyl-disiloxane (49.70 g. 0.20 mol) in N-methyl pyrrolidone (500 ml) was added 4,4'-[2,2,2-trifluoro-1-(trifluoromethyl)ethylidene]-bis(1,2-benzenedicarboxylic acid anhydride) (6FDA, 89.69 g. 0.202 mol) under a nitrogen atmosphere at room temperature. The resulting low viscosity solution was slowly heated to 194° C. over two hours with a slow nitrogen purge, distilling off 60 ml liquid (water and N-methyl pyrrolidone). The slightly viscous reaction solution was allowed to stir at 191° C.±3° C. for two hours with a total of 225 ml distillates (water and N-methyl pyrrolidone). The moderately viscous, orange-golden reaction solution was cooled to room temperature and easily poured into bottles.

A film was cast from the above reaction solution onto a glass plate treated with Du Pont TEFLON ® dry lubricant at 100° C. with a 5-mil ($13 \times 10^{-5}$ m) knife gap.

The film was dried on the plate at 100° C. for 30 minutes, cooled at room temperature and dried in a vacuum oven (20 inches [51 cm] mercury) at room temperature overnight. The film was removed from the plate by soaking in water and then dried in a vacuum oven (20 inches [51 cm] mercury) at 100° C. for four hours.

The resulting film was flexible and could be creased without breaking.

A portion of the above reaction solution was precipitated in water. The resulting solid was washed twice with water and with cyclohexane. The polymer was air-dried overnight and then dried in a vacuum oven (20 inches [51 cm] mercury) at 120° C. for 3 hours and at 250° C. for 4 hours.

Differential Scanning Calorimetry (DSC) was performed on this polymer using a Du Pont Thermal Analyzer Model 990-3 with cell model HCBl-s/NOO523, 10° C./minute progress rate in a nitrogen atmosphere. A transition correlatable to a Tg was observed at $T_{onset}=76.2°$ C., $T_{midpoint}=82.2°$ C., and $T_{endpoint}=86.7°$ C. A weak transition was observed at $T_{onset}=215.4°$ C., $T_{midpoint}=219.6°$ C., and $T_{endpoint}=224.1°$ C.

Thermogravimetric analysis (TGA) was performed on the above polymer using a Du Pont Thermogravimetric Analyzer Model 99-2 with cell Model 951-5 in an air atmosphere at a 10° C./minute progress rate. A 5% weight loss was observed at 325° C., a 25% weight loss was observed at 440° C., and a 50% weight loss was observed at 460° C.

A film was cast from a 15% solution of the above polymer (based on weight) in toluene onto a glass plate treated with Du Pont TEFLON® dry lubricant at 25.5° C. with a 20-mil ($5.1 \times 10^{-5}$ cm) knife gap. The film was dried on the plate for 1 hour at 25.5° C. and then dried in a vacuum oven (20 inches [51 cm] mercury) at room temperature overnight. The film was removed from the plate by soaking in water and was then dried in a vacuum oven (22 inches [56 cm] mercury) at 100° C. for four hours.

The resulting clear film was flexible and could be creased without cracking.

EXAMPLE 3

To a stirred solution of 1,3-bis(3-aminopropyl)-1,1,3,3-tetramethyl-disiloxane (24.85 g, 0.10 mol) in dimethylsulfoxide (350 ml) was added 4,4'-[2,2,2-trifluoro-1-(trifluoromethyl)ethylidene]-bis -( 1,2-benzenedicarboxylic acid dianhydride) (6FDA, 2.47 g, 0.0505 mol) and 1,2,4,5-benzenetetracarboxylic acid dianhydride (11.02 g, 0.0505 mol) under a nitrogen atmosphere at room temperature. The resulting low viscosity solution was allowed to stir over 3 days at room temperature. A solution of acetic anhydride (37.7 ml, 0.40 mol) and triethylamine (55.8 ml, 0.40 mol) was added at room temperature with rapid stirring. After stirring at room temperature for 4 hours, the cloudy reaction solution was precipitated in water. The resulting solid was washed with water and allowed to air-dry overnight. The product was then dried in a vacuum oven (20 inches [51 cm] mercury) at 120° C. for 2 hours and at 250° C. for 4 hours.

This polyimide was found to be soluble in toluene, acetone, methylene dichloride, m-cresol, dimethylsulfoxide and N-methylpyrrolidone.

Differential Scanning Calorimetry (DSC) was performed on this polymer using a Du Pont Thermal Analyzer Model 990-3 with cell model HCBl-s/NOO523, 10° C./minute progress rate in a nitrogen atmosphere. A transition correlatable to a Tg was observed at $T_{onset}=66.0°$ C., $T_{midpoint}=72.6°$ C., and $T_{endpoint}=75.2°$ C.

Thermogravimetric analysis (TGA) was performed on the above polymer using a Du Pont Thermogravimetric Analyzer Model 99-2 with cell Model 951-5 in an air atmosphere at a 10° C./minute progress rate. A 5% weight loss was observed at 385° C., a 25% weight loss was observed at 455° C., and a 50% weight loss was observed at 475° C.

Films were cast from a 15% solution of the above polymer (based on weight) in N-methyl pyrrolidone onto a glass plate treated with Du Pont TEFLON® dry lubricant at 100° C. with a 15-mil ($38 \times 10^{-5}$ m) knife gap. The films were dried on the plate at 100° C. for 30 minutes, cooled to room temperature and further dried in a vacuum oven (20 inches [51 cm] mercury) at room temperature overnight. The films were removed from the glass plates by soaking in water over four days. The films were dried in a vacuum oven (20 inches [51 cm] mercury) at 120° C. for 4 hours.

The clear films were flexible and could be creased without breaking.

EXAMPLE 4

To a stirred solution of 1,3-bis(3-aminopropyl)-1,1,3,3-tetramethyl-disiloxane (24.85 g, 0.10 mol) in N-methyl pyrrolidone (350 ml) was added 4,4'-[2,2,2-trifluoro-1-(trifluoromethyl)ethylidene]-bis(1,2-benzenedicarboxylic acid anhydride) (6FDA, 22.42 g, 0.0505 mol) and 3,3,,4,4'-benzophenonetetracarboxylic acid dianhydride (16.27 g, 0.0505 mol) under a nitrogen atmosphere at room temperature. The resulting light yellow, low viscosity solution was stirred at room temperature for 20.5 hours. A solution of acetic anhydride (37.7 mol, 0.40 mol) and triethylamine (55.8 ml, 0.40 mol) was added at room temperature with rapid stirring. After stirring at room temperature for 26 hours, the low viscosity solution was precipitated in water. The resulting solid was washed twice with water and with cyclohexane and allowed to air-dry overnight. The product was then dried in a vacuum oven (20 inches [51 cm] mercury) at 120° C. for 3 hours and at 250° C. for 5 hours to yield 52.0 g polymer.

This polyimide was found to be soluble in toluene, acetone, methylene dichloride, m-cresol, N-methyl pyrrolidone, and N,N-dimethylacetamide.

Differential Scanning Calorimetry (DSC) was performed on this polymer using a Du Pont Thermal Analyzer Model 990-3 with cell model HCBl-s/NOO523, 10° C./minute progress rate in a nitrogen atmosphere. A transition correlatable to a Tg was observed at $T_{onset}=71.0°$ C., $T_{midpoint}=76.8°$ C., and $T_{endpoint}=81.4°$ C. A weak transition was observed at $T_{onset}=216.5°$ C., $T_{midpoint}=219.7°$ C., and $T_{endpoint}=223.3°$ C.

Thermogravimetric Analysis (TGA) was performed on the above polymer using a Du Pont Thermogravimetric Analyzer Model 99-2 with cell Model 951-5 in an air atmosphere at a 10° C./minute progress rate. A 5% weight loss was observed at 405° C., a 25° C. weight loss was observed at 460° C. and a 50% weight loss was observed at 470° C.

Films were cast from a 15% solution of the above polymer (based on weight) in N-methyl pyrrolidone onto a glass plate treated with Du Pont TEFLON® dry lubricant at 100° C. with a 15-mil ($38 \times 10^{-5}$ m) knife gap. The films were dried on the plate at 100° C. for 30 minutes, cooled to room temperature and dried in a vacuum oven (20 inches (51 cm) mercury) at room temperature overnight. The films were removed from the glass plates and dried in a vacuum oven (20 inches [51 cm] mercury) at 120° C. for 3 hours.

The resulting clear films were flexible and could be creased without breaking.

Films were cast from a 15% solution of the above polymer (based on weight) in toluene onto a glass plate treated with Du Pont TEFLON® dry lubricant at 25.5° C. with a 20-mil (51 cm) knife gap. The film was dried on the plate at 25.5° C. for 1 hour and then dried in a vacuum oven (20 inches [51 cm] mercury) at room temperature overnight. The film was removed from the glass plate by soaking in water and was then dried in a vacuum oven (23 inches [53 cm] mercury) at 100° C. for 4 hours.

The resulting clear film was flexible and could be creased without breaking.

EXAMPLE 5

To a stirred solution of 1,3-bis(3-aminopropyl)-1,1,3,3-tetramethyl-disiloxane (24.85 g, 0.10 mol) in N-methyl pyrrolidone (350 ml) was added 4,4'[2,2,2-trifluoro-1-(trifluoromethyl)ethylidene]-bis(1,2-benzenedicarboxylic acid anhydride) (6FDA, 22,42 g, 0.0505 mol) and 3,3',4,4'-benzophenonetetracarboxylic acid dianhydride (14.86 g, 0.0505 mol) under a nitrogen atmosphere at room temperature. The resulting low viscosity solution was stirred at room temperature for 23 hours and then a solution of acetic anhydride (37.7 ml, 0.40 mol) and triethylamine (55.8 ml, 0.40 mol) was added with rapid stirring. After stirring at room temperature for 4 hours, the low viscosity solution was precipitated in water and the resulting solid was washed twice with water and with cyclohexane. The polymer was air-dried overnight and then dried in a vacuum oven (20 inches [51 cm] mercury) at 120° C. for 5 hours and at 250° C. for 4 hours to yield 56.0 g polymer.

This polyimide was found to be soluble in toluene, dichloromethane, m-cresol, N-methyl pyrrolidone, and N,N-dimethylacetamide.

Films were cast from a 15% solution of the above polymer (based on weight) in N-methyl pyrrolidone onto a glass plate treated with Du Pont TEFLON® dry lubricant at 100° C. with a 15-mil (38×10$^{-31\ 5}$ m) knife gap. The films were dried on the plate at 100° C. for 30 minutes, cooled to room temperature, and then dried in a vacuum oven (20 inches [51 cm] mercury) at room temperature overnight. The films were removed from the glass plates and dried in a vacuum oven (20 inches [51 cm] mercury) at 120° C. for 3 hours.

The resulting films were flexible and could be creased without breaking.

Differential Scanning Calorimetry (DSC) was performed on this polymer using a Du Pont Thermal Analyzer Model 990-3 with cell model HCB1-s/NOO523, 10° C./minute progress rate in a nitrogen atmosphere. A transition correlatable to a Tg was observed at $T_{onset}=71.7°$ C., $T_{midpoint}=77.5°$ C., and $T_{endpoint}=82.6°$ C. A weak transition was observed at $T_{onset}=218.0°$ C., $T_{midpoint}=220.4°$ C., and $T_{endpoint}=224.0°$ C.

Thermogravimetric Analysis (TGA) was performed on the above polymer using a Du Pont Thermogravimetric Analyzer Model 99-2 with cell Model 951-5 in an air atmosphere at a 10° C./minute progress rate. A 5% weight loss was observed at 360° C., a 25% weight loss was observed at 455° C., and a 50% weight loss was observed at 475° C.

The materials described herein may find use as dielectric layers, passivating coatings, and adhesives in the electronics industry, as dielectric wire coatings, as hot-melt adhesives, as melt-processable polyimides, and the like.

I claim:

1. A fully-cyclized polyimide silane consisting essentially of the following:

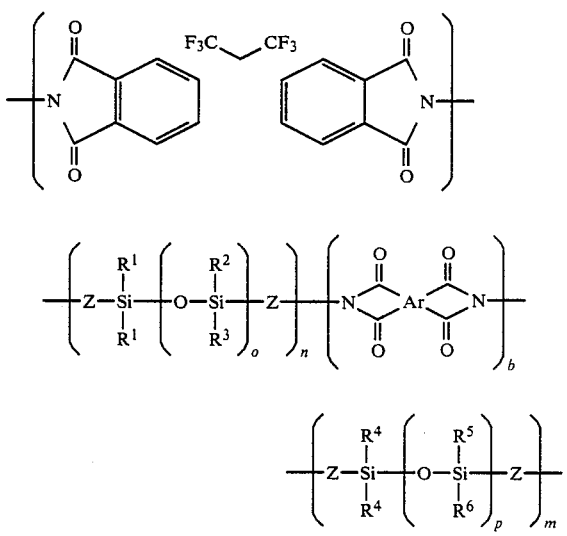

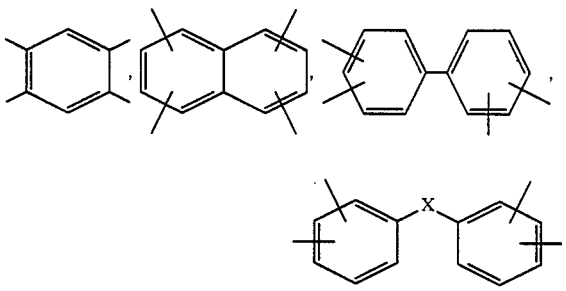

where $\diagdown_{Ar}\diagup$ is an aromatic radical, of the formula

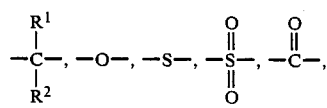

or mixtures thereof, —X— is

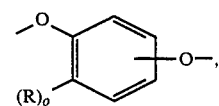

or mixtures thereof, —X— is

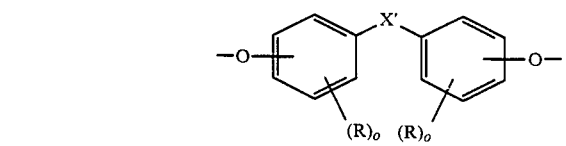

linear alkylene groups of the formula —(CH$_2$)—1-3 or mixtures thereof, where —X'— is

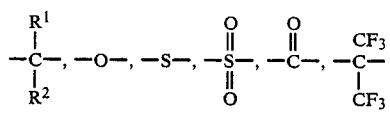

or mixtures thereof, —z— is a divalent substituted or unsubstituted alkylene or arylene radical, —R, —R$^1$, —R$^2$, R$^3$, —R$^4$, —R$^5$, and —R$^6$ are independently monovalent substituted or unsubstituted hydrocarbon radicals such that a=5—100% of a+b
b=0—95% of a+b
n+m=100%
o=1—4.

2. The polyimide of claim 1 wherein a=50—100% of a+b.

3. The polyimide of claim 2 where Ar is

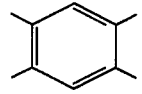

4. The polyimide of claim 2 wherein Ar is

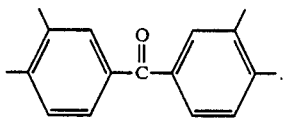

5. The polyimide of claim 2 wherein a=100% of a+b.

* * * * *

UNITED STATES PATENT AND TRADEMARK OFFICE
CERTIFICATE OF CORRECTION

PATENT NO. : 4,931,539

DATED : June 5, 1990

INVENTOR(S) : Richard A. Hayes

It is certified that error appears in the above-identified patent and that said Letters Patent is hereby corrected as shown below:

Column 10, diagram appearing between lines 10-20 should be as follows:

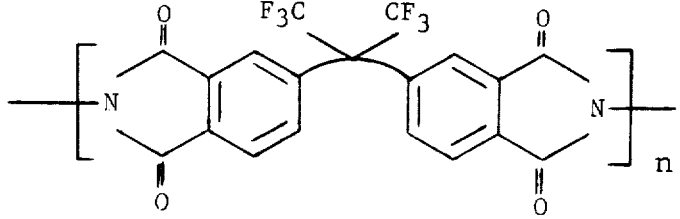

Column 10, delete line 51.

Column 11, line 6, replace "$-\underset{\underset{CF_3}{|}}{\overset{CF_3}{C}}-$" with $-\underset{\underset{CF_3}{|}}{\overset{\overset{CF_3}{|}}{C}}-$.

Column 11, line 11, replace "-z-" with -Z-.

Signed and Sealed this

Thirtieth Day of June, 1992

Attest:

DOUGLAS B. COMER

Attesting Officer

Acting Commissioner of Patents and Trademarks